US008707205B2

(12) United States Patent
Scott

(10) Patent No.: US 8,707,205 B2
(45) Date of Patent: Apr. 22, 2014

(54) METHOD AND APPARATUS FOR CONTROLLING A DISPLAY IN AN ELECTRONIC DEVICE

(75) Inventor: Sherryl Lee Lorraine Scott, Toronto (CA)

(73) Assignee: BlackBerry Limited, Waterloo (CA)

( * ) Notice: Subject to any disclaimer, the term of this patent is extended or adjusted under 35 U.S.C. 154(b) by 1164 days.

(21) Appl. No.: 11/216,054

(22) Filed: Sep. 1, 2005

(65) Prior Publication Data
US 2007/0050730 A1 Mar. 1, 2007

(51) Int. Cl.
*G06F 3/048* (2013.01)
(52) U.S. Cl.
USPC ........... 715/809; 715/744; 715/762; 715/790; 715/810; 715/822; 715/835; 715/864
(58) Field of Classification Search
USPC ......... 715/864, 809, 822, 790, 762, 810, 835, 715/744
See application file for complete search history.

(56) References Cited

U.S. PATENT DOCUMENTS

| | | | | |
|---|---|---|---|---|
| 5,790,120 | A * | 8/1998 | Lozares et al. | 715/779 |
| 5,961,620 | A * | 10/1999 | Trent et al. | 710/105 |
| 6,144,377 | A * | 11/2000 | Oppermann et al. | 715/744 |
| 6,211,858 | B1 * | 4/2001 | Moon et al. | 715/771 |
| 6,304,886 | B1 * | 10/2001 | Bernardo et al. | 715/234 |
| 6,728,734 | B2 * | 4/2004 | Nolan et al. | 707/201 |
| 6,876,368 | B2 * | 4/2005 | Dove et al. | 715/762 |
| 6,891,552 | B1 | 5/2005 | Bush | |
| 7,076,738 | B2 * | 7/2006 | Baker et al. | 715/763 |
| 7,086,008 | B2 * | 8/2006 | Capps et al. | 715/762 |
| 7,266,508 | B1 * | 9/2007 | Owen et al. | 705/7.13 |
| 8,406,805 | B2 * | 3/2013 | Scott | 455/550.1 |
| 2003/0112465 | A1 * | 6/2003 | Ohara | 358/1.15 |
| 2003/0182378 | A1 * | 9/2003 | Treptow et al. | 709/206 |
| 2003/0210280 | A1 * | 11/2003 | Baker et al. | 345/835 |
| 2003/0229900 | A1 * | 12/2003 | Reisman | 725/87 |
| 2004/0139183 | A1 * | 7/2004 | Motoyama et al. | 709/223 |
| 2005/0129241 | A1 * | 6/2005 | Hardy et al. | 380/270 |
| 2006/0236252 | A1 * | 10/2006 | Brychell et al. | 715/762 |
| 2006/0277497 | A1 * | 12/2006 | Minagawa et al. | 715/819 |
| 2007/0029373 | A1 * | 2/2007 | Bumiller | 235/375 |

FOREIGN PATENT DOCUMENTS

| | | | | | |
|---|---|---|---|---|---|
| JP | 08305873 | A | * | 11/1996 | G06T 11/80 |
| JP | 09022338 | A | * | 1/1997 | G06F 3/14 |
| WO | 03/100591 | A2 | | 12/2003 | |
| WO | WO 03/100591 | A2 | * | 12/2003 | |

OTHER PUBLICATIONS

Stand Alone, Inc. Card Copy for Palm OS, 2004, http://standalone.com/palmos/cardcopy/manual/.*
Norasiah M, Intelligent Student Information System, Jan. 14-15, 2003 Telecommunication Technology 2003 pp. 221-215.*
Sun Inc, How to Make Dialogs Nov. 28, 1999 http://java.sun.com/docs/books/tutorial/uiswing/components/dialog.html.*
Microsoft outlook 2003; Chapter 5: Using the Address Book; 2003; pp. 105-112.*

(Continued)

*Primary Examiner* — Linh K Pham
(74) *Attorney, Agent, or Firm* — Perry + Currier Inc.

(57) ABSTRACT

A method and apparatus for presenting information is provided. In an embodiment, an electronic device with wireless telephony features is provided. An embodiment includes a flexible dialog box tailored to the resources limitations of electronic devices.

17 Claims, 11 Drawing Sheets

(56) References Cited

OTHER PUBLICATIONS

M.A. Norasiah et al. "Intelligent Student Information System", IEEE, 4th National Conference on Telecommunication Technology Proceedings, Shah Alam, Malaysia, p. 212-215.

Canadian Patent Application No. 2558210 Office Action dated Feb. 8, 2011.
European Patent Application No. 05108031.5 Summons to attend oral proceedings pursuant to Rule 115(1) EPC dated Sep. 11, 2013.
Canadian Patent Application No. 2,558,210 Office Action dated Feb. 15, 2010.

* cited by examiner

METHOD AND APPARATUS FOR CONTROLLING A DISPLAY IN AN ELECTRONIC DEVICE

FIELD

The present application relates generally to electronic devices and more particularly to a method and apparatus for controlling a display of an electronic device.

BACKGROUND

The functionality originally separately found in personal digital assistants ("PDAs"), cellular telephones, paging devices, and wireless email devices is increasingly being integrated into a single portable electronic device ("PED"). Research In Motion Limited of Waterloo, Ontario, Canada, and PalmOne, Inc. of Milpitas, Calif. USA are two examples of manufacturers of such enhanced wireless electronic devices, and each offers a variety of products in this category.

Because of the myriad of complex functions that are offered in PEDs, it is important that users are presented with a user interface that is highly usable, to allow the user to navigate through various PED functions and access desired features. It is important that the user be able to easily ascertain the nature of the information and react appropriately. While efforts are made in existing PEDs to provide user-friendly interfaces, it is noted that in many prior art PED's dialog boxes that are presented in response to user input can present unclear information and be awkward or difficult for the user to interpret. For example, a dialog box that asks the user to confirm whether a particular telephone number is to be deleted may simply say "Delete!", and offer a "OK" or "Exit" options. In this example, "Delete!" should be phrased as the question "Delete?" and similarly, "OK" and "Exit" should be rephrased as "Yes" and "No", respectively. This problem is exacerbated by the fact that computing resources in a PED are constrained in relation to a full-blown desktop or laptop computer. Relative to larger computers, PEDs tend to have less volatile and non-volatile memory, smaller screens, and small keypads. Thus, the exemplary "Delete!" dialog box may consume a large portion of the PED display that covers the actual telephone entry that the user was trying to delete, and as such the user will have difficulty confirming the correct number is being deleted. By the same token, however, the desire to provide more informative dialog boxes is constrained by the limited memory and processing resources of the PED.

SUMMARY

It is an object to provide a novel method and apparatus to control a display that obviates or mitigates at least one of the above-identified disadvantages.

According to an aspect of the invention, there is provided a method of controlling the display of a portable electronic device having a display comprising the steps of:
  rendering a screen on the display, the screen corresponding to a user application;
  receiving a user-input command from a user of the device that corresponds to a function associated with the screen;
  calling a dialog box application corresponding to the function, the dialog box application having a plurality of configurable fields;
  accessing a database containing objects, at a least a portion of the objects reproducing information on the screen such that contents of the screen can be identified based on the objects;
  populating fields in the dialog box application with the objects; and,
  rendering the dialog box application over the screen.

The user application can be, for example, a telephone application, a messaging application, a calendar application, an address book application and a memo application.

The function can be, for example, a save command or a delete command within one of the applications.

The fields can include, for example, an icon corresponding to the user applications, a fixed message, a variable message, a message-type icon, and an option button.

The fields can comprise at least two option buttons. One of the option buttons can be a default option button which pre-selects a lossless action.

The fields can comprise at least three option buttons, two of the option buttons having lossless actions and one of the option buttons having a lossy action. A default option button can be pre-selected. The default option button is the one of the options buttons having a lossless action that is farthest from the option button having a lossy action.

The database can further comprise layout characteristics representing at least one of locations, colours, sizes and fonts for the fields within the dialog box such that the physical layout of the dialog box application is configurable. The layout characteristics can thus be configurable for each function.

Another aspect of the present application comprises a computer-readable medium containing a set of programming instructions executable by a microcomputer of a portable electronic device. The programming instructions carry out the aforementioned method.

Another aspect of the present application provides a portable electronic device comprising a display and a microcomputer connected to the display. The microcomputer is operable to execute a user application. The microcomputer is also operable to control the display in order to render at least one screen on the display. The screen corresponds to some aspect of the user application. The device also includes a user-input device that is connected to the microcomputer. The user-input device is operable to forward a received command from a user at the device to the microcomputer. The command corresponds to a function associated with the screen that is being rendered. The microcomputer is also operable to call a dialog box application corresponding to the function. The dialog box application has a plurality of configurable fields. The microcomputer is also operable to access a database containing objects that are for populating the fields. At a least a portion of the objects reproduce information on the screen such that contents of the screen can be identified based on the objects. The microcomputer is also operable to populate the fields in the dialog box application with the objects. The microcomputer is also operable to control the display in order to render the dialog box application over the screen such that at least a portion of the screen is obscured.

The device can include a modem-radio combination such that the device is operable to communicate with a wireless base station. The microcomputer can be operable to update the database based on command instructions received wirelessly from the base station.

BRIEF DESCRIPTION OF THE DRAWINGS

Certain embodiments will now be described, by way of example only, with reference to the attached figures, wherein.

DETAILED DESCRIPTION

Figure 1:
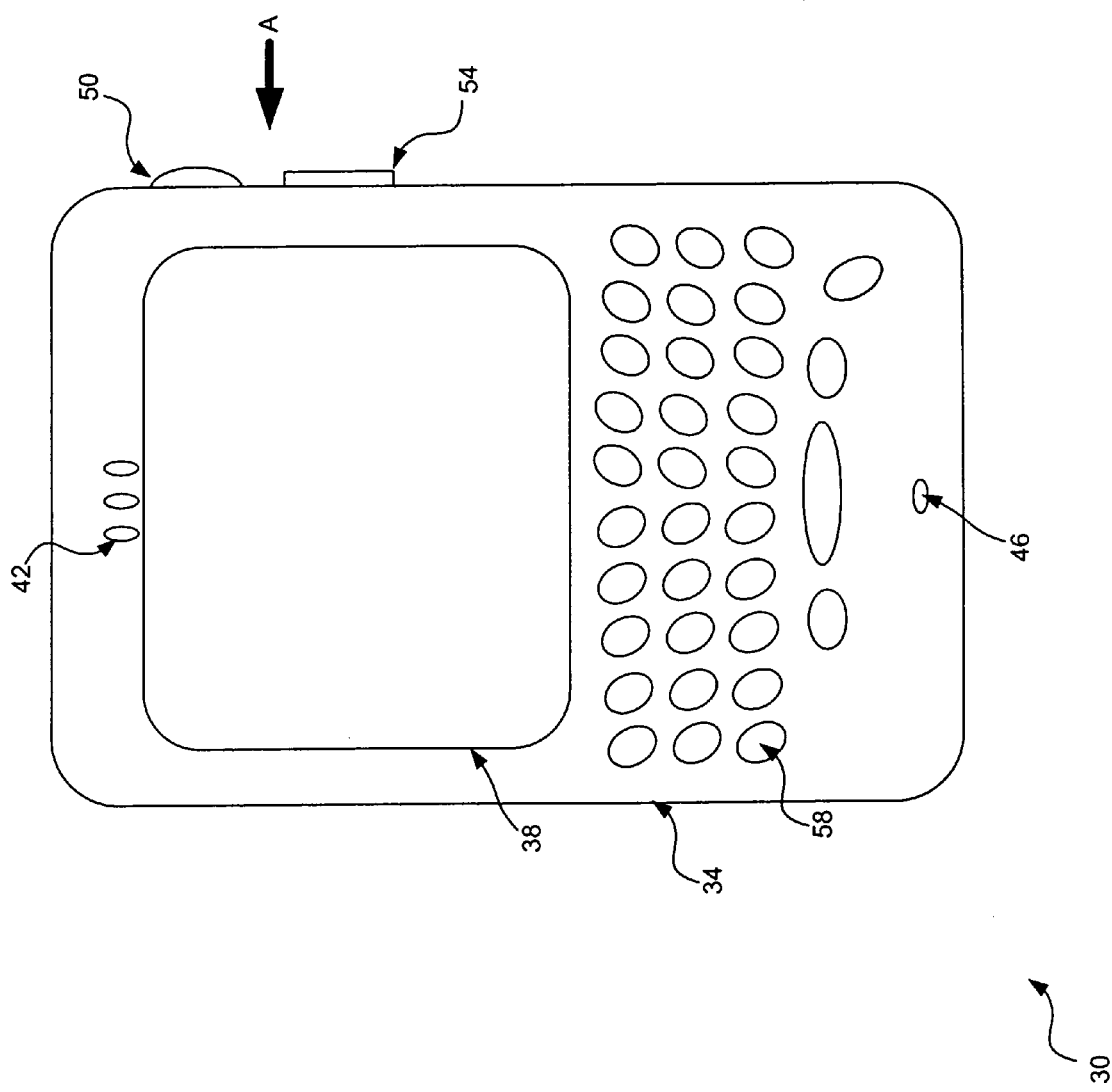
FIG. 1 is a schematic representation of a portable electronic device in accordance with an embodiment.

Referring now to FIG. 1, a portable electronic device ("PED") in accordance with an embodiment is indicated generally at 30. In the present embodiment, device 30 is based on the computing environment and functionality of a personal digital assistant with wireless voice telephony capabilities. However, it is to be understood that device 30 can be based on the construction and functionality of any mobile electronic device that can be connected to a wireless network. Such devices include cellular telephones or laptops computers connected to wireless networks. In a present embodiment, electronic device 30 includes, a housing 34, which frames an LCD display 38, a speaker 42, a microphone 46, a trackwheel 50, an exit key 54 and a keyboard 58. Trackwheel 50 and exit key 54 can be inwardly depressed along the path of arrow "A" as a means to provide additional user-input. It will be understood that housing 34, can be made from any suitable material as will occur to those of skill in the art.

Figure 2:
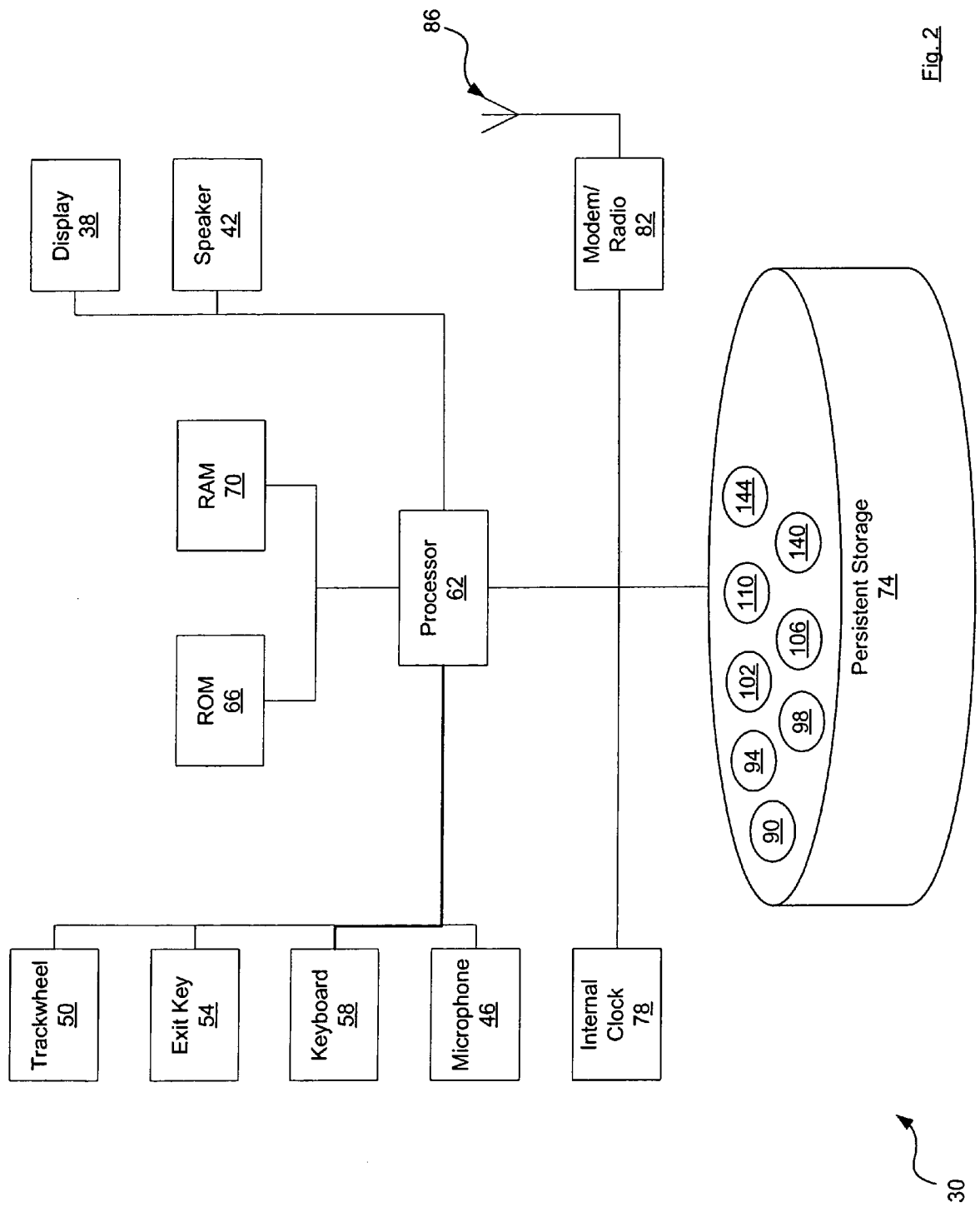
FIG. 2 is a block diagram of certain internal components of the device of FIG. 1.

Referring now to FIG. 2, a block diagram of certain internal components within device 30 are shown. Device 30 includes a processor 62. Processor 62 is connected to a read-only-memory ("ROM") 66, which contains a plurality of applications executable by processor 62 that enables device 30 to perform certain functions. Processor 62 is also connected to a random access memory unit ("RAM") 70 and a persistent storage device 74 which is responsible for various nonvolatile storage functions of device 30. Collectively, processor 62, ROM 66, RAM 70, persistent storage device 74 and internal clock 78 compose a microcomputer.

Processor 62 can send output signals to various output devices including display 38 and speaker 42. Processor 62, can also receive input from various input devices including microphone 46, trackwheel 50, exit key 54 and keyboard 58. Processor 62 is also connected to an internal clock 78 and a modem and radio 82. Modem and radio 82 are operable to connect device 30 to one or more wireless base stations in range of device 30, in the usual manner, via an antenna 86.

Persistent storage 74 also stores a plurality of the applications that are executable by processor 62, and data files that are used by those applications to allow device 30 to performs its intended functions. Applications and data files are represented as circles disposed within persistent storage 74. Each application and data file will be discussed in greater detail below.

Figure 3:
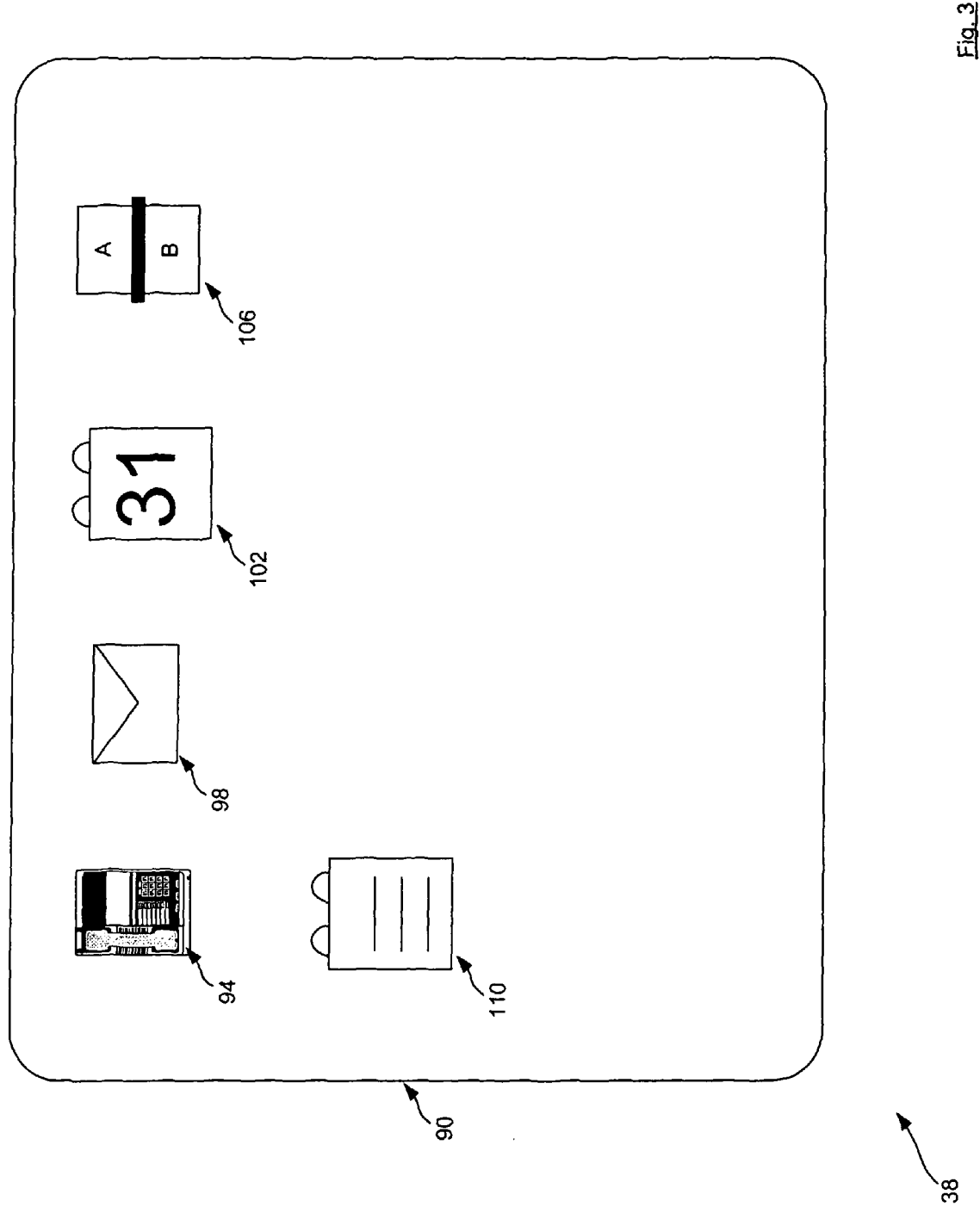
FIG. 3 is a representation of a main menu screen being presented on the display of FIG. 1.

Referring now to FIG. 3, a screen shot is shown presenting a main menu application 90 that is stored on persistent storage device 74 and executed on processor 62 is shown on display 38. (It is to be understood that the information shown in on display 38 in this example is merely exemplary, and that other information, and/or the exact layout of information need not be exactly as shown.)

The menu of choices of applications presented by application 90 can include a plurality of applications, such as a telephone application 94, a messaging application 98 (e.g. email and/or short message service), a calendar application 102, an address book application 106, and a memo application 110. Telephone application 94 allows a user of device 30 to conduct a voice telephone call. Email messaging application 98 allows a user to send and receive email messages. Calendar application 102 allows a user to manage calendar appointments. Address book application 106 allows a user to manage contact information. Memo application 110 allows a user to maintain a virtual note pad for lists and other discrete pieces of primarily text information. While a specific set of applications is shown in menu application 90, it is to be understood that such applications are exemplary and different combinations and/or types of offerings of applications can be shown, as desired, according to the features, functions and/or applications and the like that are associated with device 30.

Each application can be accessed by a user operating device 30 using any appropriate user-input means, such as by scrolling to an application using trackwheel 50 to navigate until the appropriate icon representing the pre-selected application is highlighted, and then depressing trackwheel 50 along the path indicated by "A" in FIG. 1 to actually select the application and cause its execution.

Those of skill in the art will now recognize that the use of the term "pre-select" and its variants refers to the highlighting of a particular icon or field being presented on display 38, while the term "select" and its variants refer to depressing trackwheel 50 along the path indicated by "A" in FIG. 1 while a particular icon or field is pre-select in order to effect an action associated with the pre-selected highlighted icon or field being presented on display 38.

The general functions of applications 94, 98, 102, 106 and 110 can be based on any known functionality as currently found on existing or future PEDs. However, it should be understood that such applications 94, 98, 102, 106 and 110 are merely exemplary.

Figure 4:
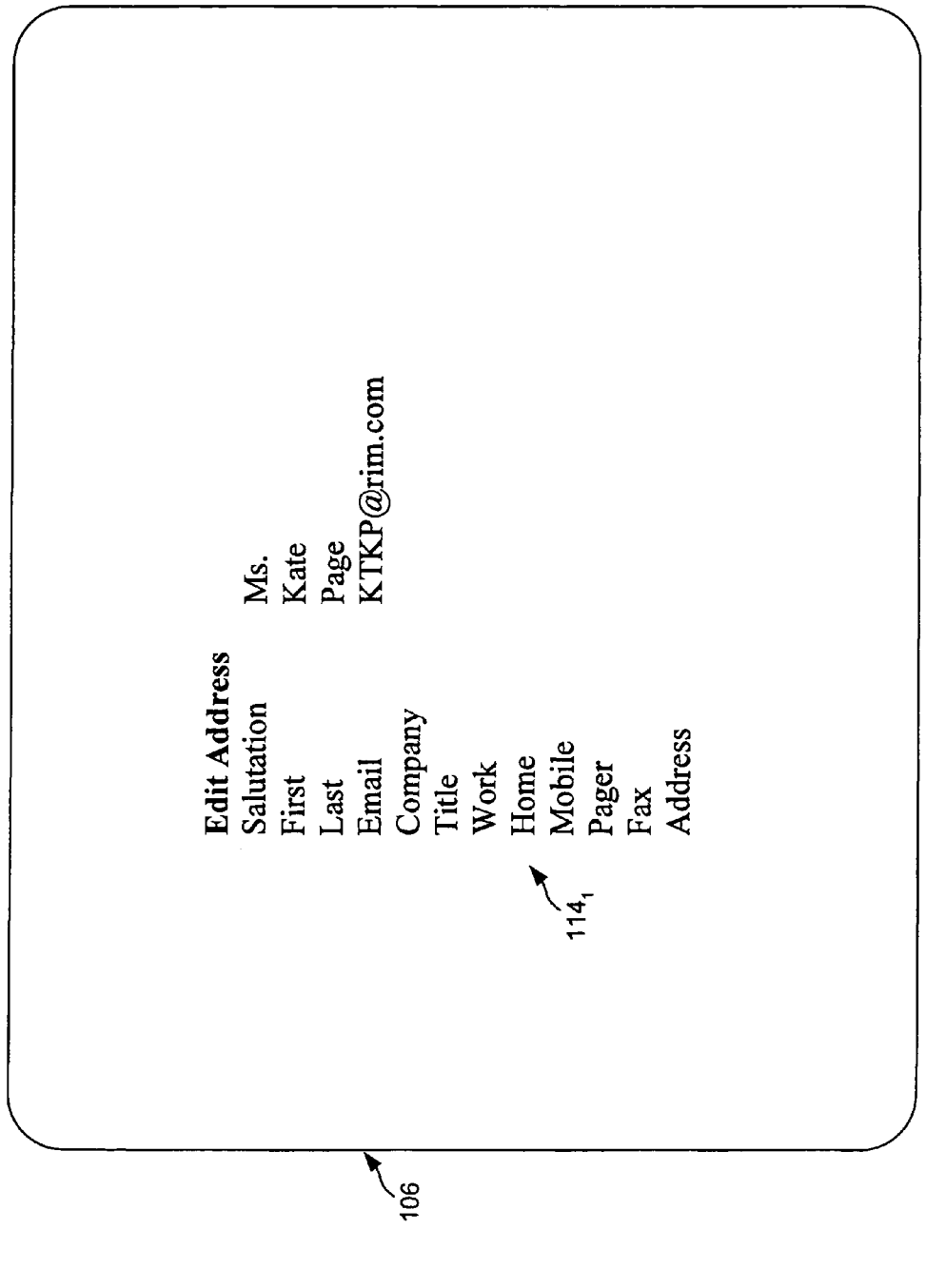
FIG. 4 is a representation of an edit address screen from a contacts application being presented on the display of FIG. 1.

Referring now to FIG. 4, an "Edit Address" screen of address book application 106 is shown and indicated at $114_1$. (As will be understood by those skilled in the art, address book 106 can have a plurality of different screens, for viewing, searching, etc. of addresses stored therein, and FIG. 4 only shows one of such screens.) Edit Address screen $114_1$, shows an exemplary record of an individual named Kate Page, which a user of device 30 can now edit.

Figure 5:
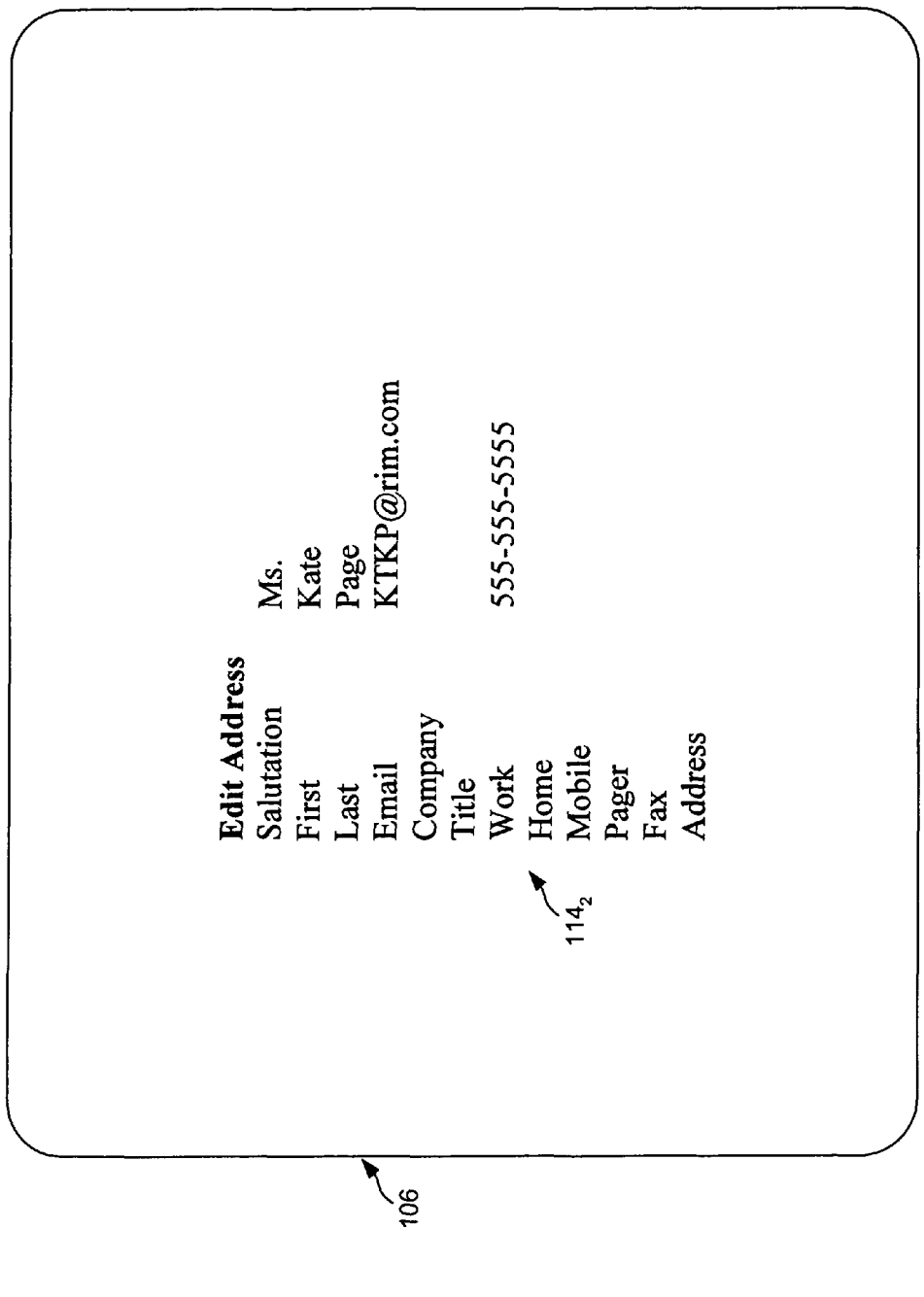
FIG. 5 is the screen of FIG. 4 having been updated.

Referring now to FIG. 5 Edit Address screen $114_1$, from FIG. 4 is shown as being updated and now indicated in FIG. 5 as Edit Address screen $114_2$. Edit Address screen $114_2$ now the addition of a work telephone number including the number "555-555-5555" in the corresponding work telephone number field.

As is commonly employed in PEDs, before the change shown in Edit Address screen $114_2$ is committed to persistent storage 74, a user is often presented with a dialog box asking the user to confirm the changes. To get to such a dialog box, the user will typically invoke some sort of "save" command from screen $114_2$, via key-strokes or via a menu or other appropriate input means.

Figure 6:
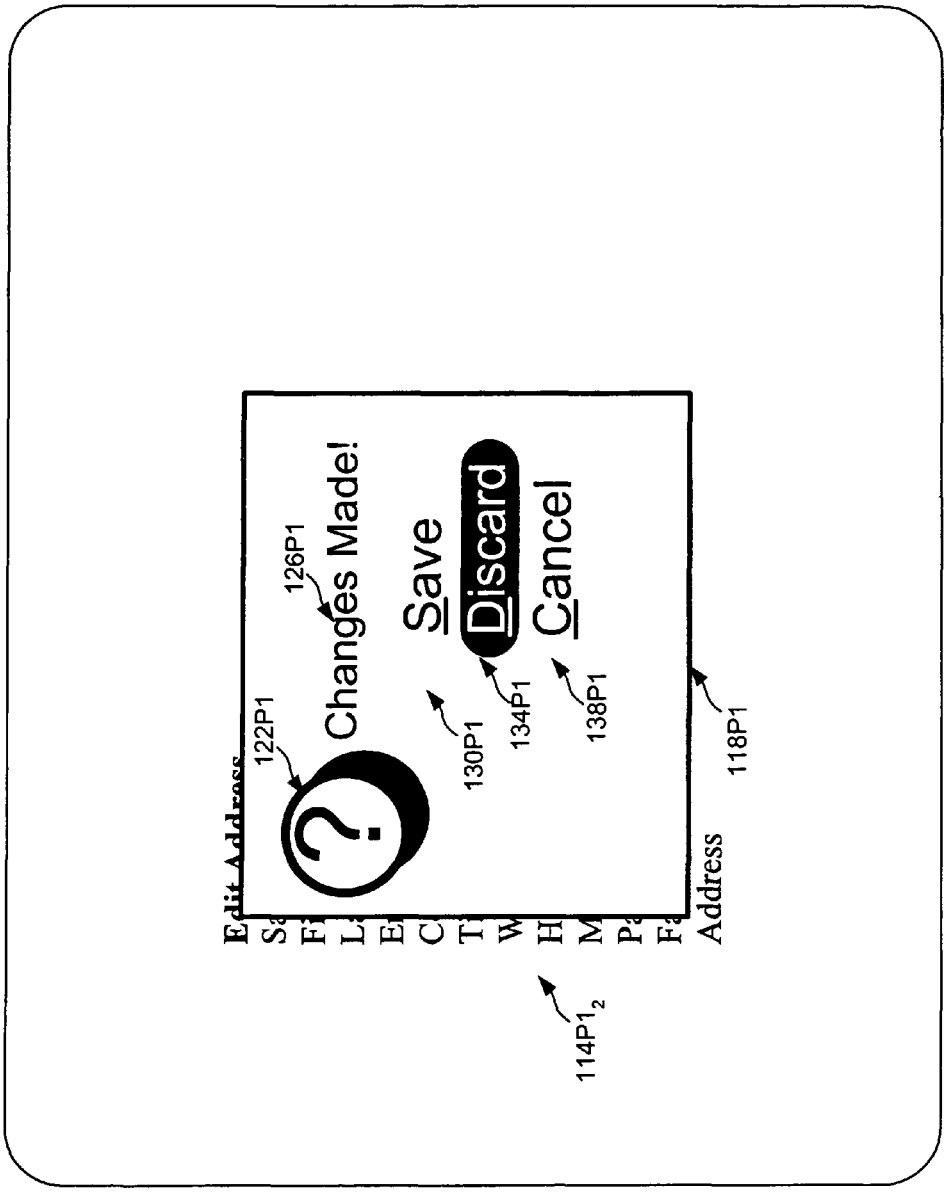
FIG. 6 is a representation of an exemplarily prior art dialog box.

FIG. 6 shows a prior art version of such a dialog box, which suffers from a number of disadvantages. FIG. 6 includes substantially the same elements as FIG. 5, but all elements are followed by the suffix P1, to indicate that the elements shown in FIG. 6 are all prior art. FIG. 6 also includes a prior art dialog box 118P1. Prior art dialog box 118P1 is comprised of an icon 122P1, a message 126P1, and a plurality of option buttons 130P1, 134P2, 138P1. Icon 122P1 is an encircled question mark, while message 126P1 indicates "Changes Made!". This is a first disadvantage in that the contents of icon 112P1 contradicts the exclamatory nature of message 126P1.

Option button 130P1 presents a "Save" option, option button 134P1 presents a "Discard" option, and option button 138P1 presents a "Cancel" option. In FIG. 6, option button 138P1 is shown as being highlighted by reversing the colours of the button and text therein in relation to the other option buttons 134P1 and 138P1. In a prior art version of device 30, trackwheel 50 can be used to scroll through such option buttons 130P1, 134P2 and 138P1, likewise reversing the colours of each in relation to each other to denote pre-selection. Trackwheel 50 can be depressed along the path indicated by arrow "A", or the "enter" key can be depressed, to make the actual selection. (Other types of input means, however, for pre-selecting and/or selecting one of the options buttons 130P1, 134P1 and 138P1 can also be used.) Option buttons 130P1, 134P1 and 138P1 suffer from their own disadvantages. Particularly, when option button 134P1 "Discard", is presented in conjunction with option button 138P1 "Cancel" can result in confusion for the user. In other words, while Discard means "discard these changes and exit the edit address screen" and Cancel means "cancel this operation and return to the edit address screen for further editing"—it is possible to confuse these meanings and select one instead of the other. Also of concern is that the default option highlighted in dialog box 118P1 is "Discard", which is a 'lossy' action, whereby the addition of the number 555-555-5555 would be lost and irretrievable. Also of concern is that the lossy "Discard" option is directly adjacent to the constructive "Save" option, leading to an increased possibility of "Discard" being selected unintentionally.

Within the context of the example given in the previous paragraph (and other examples throughout the specification), it is to be understood by those of skill in the art that, as used herein, the term "lossy" is given a specific meaning to denote user-selections which result in the loss of changes made by the user. Likewise, as used herein, the term "lossless" is given the opposite meaning to "lossy", whereby "lossless" denotes user-selections which result in the preservation of changes made by the user.)

A still further difficulty with prior art dialog box 118P1 is that it covers up the information in Edit Address screen $114_2$, and thus the user is unable to verify that the changes being made are desirable.

A general difficulty with dialog box 118P1 is that it is often designed to meet the needs of a plurality of different applications executing on a prior art PED, in order to make efficient use of computing resources on the PED due to the portable nature thereof, and thus ambiguities and lack of clarity in the messages being conveyed and the requested input are predictable. Put in other words, a "one-size-fits-all" dialog box intended to serve a plurality of different applications on an application-rich. PED, without obscuring the underlying information of a screen (such as screen $114_2$) while facilitating of the appropriate option in the dialog box, is a difficult problem, and prior to the teachings provided in the present patent application, this remains an unsolved problem.

Figure 7:
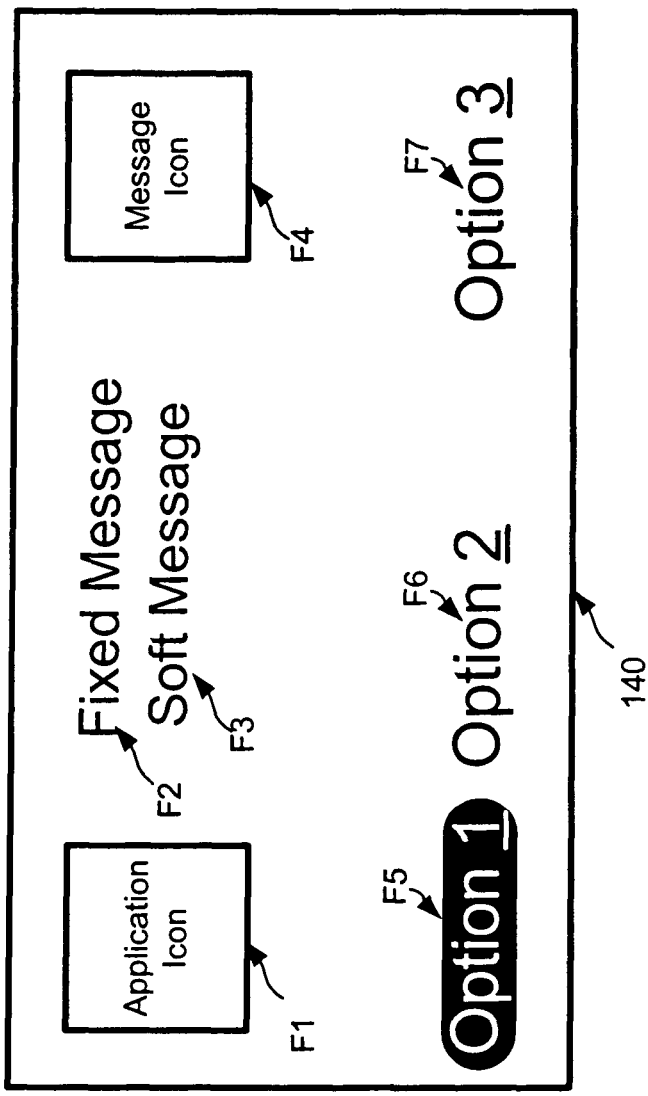
FIG. 7 is a representation of a dialog box application in accordance with another embodiment.

To address at least one of these problems, a dialog box application in accordance with another embodiment will now be described, and a representation of this application shown in FIG. 7 and indicated generally at 140. Dialog box application 140 is accessible to applications 94, 98, 102, 106 and 110 and thus dynamically configurable in order to be able to present a user-friendly interface according to the context in which the dialog box application 140 is invoked. In the example shown in FIG. 7, application 140 includes eight fields, but fewer or more fields can be provided as desired. Field 1, indicated at "F1", is reserved for presenting the icon corresponding to which of the applications 94, 98, 102, 106 and 110 made the call for dialog box application 140. For example, in edit address screen $114_2$, field F1 could be set to the address book icon indicated at item 106 in FIG. 3.

Field 2, indicated at "F2" is reserved for fixed messages. Fixed messages also correspond to the particular application 94, 98, 102, 106 or 110 which made the call for application 140, and also correspond to the particular function that was being accessed. For example, in edit address screen $114_2$, field F2 could be set to read "Do you want to save the changes you made to the address belonging to".

Field 3, indicated at "F3" is reserved for variable messages. Variable messages correspond to the particular record or other specific item according to the function that was being accessed for the corresponding application 94, 98, 102, 106 or 110. For example, in edit address screen $114_2$, field F2 could be set to read "Kate Page". Thus, when F2 and F3 are read together, the complete message would read "Do you want to save the changes you made to the address belonging to Kate Page"

Field 4, indicated at "F4" is reserved for a message icon, which is typically representative of a type of message being conveyed by application 140. Such a message icon could, for example, be a graphical punctuation mark (e.g. graphical punctuation mark could be icon 122P1 from FIG. 6) that grammatically fits the message conveyed by fields F2 and F3. Such a message icon could, for example, be a graphical punctuation mark (e.g. graphical punctuation mark icon 122P1 from FIG. 6) that grammatically fits the message conveyed by fields F2 and F3.

Field 5, indicated at "F5" is reserved for an option button. Preferably, this option button is the default option button, and is chosen to default to pre-select a lossless action. For example, in edit address screen $114_2$, field F5 could be set to read "Yes".

Field 6, indicated at "F6" is reserved for an option button. For example, in edit address screen $114_2$, field F6 could be set to read "Return to Editing".

Field 7, indicated at "F7" is reserved for an option button. This option button chosen to be the lossy action, and is thus oriented farther away from Field 5 and Field 6. For example, in edit address screen $114_2$, field F7 could be set to read "Discard changes and exit".

Table I continues with the above example, showing an exemplary database (indicated at reference 144 in FIG. 2) that can be used by application 140 when application 140 is invoked from edit address screen 114.

TABLE I

Exemplary contents of a record database
144 accessible to application 140

| Entry # | Column 1 Name | Column 2 Contents | Column 3 Action |
|---|---|---|---|
| 1 | Calling Application | Address Book Application 106 | None |
| 2 | Calling Screen within Application | Edit Address Screen 114 | None |
| 3 | Calling Function within Screen | Save | None |
| 4 | Field 1 | Address Book Icon | None |
| 5 | Field 2 | "Do you want to save the changes you made to the address belonging to" | None |
| 6 | Field 3 | {Retrieve First Name; Last Name of currently displayed Edit Screen 114} | None |
| 7 | Field 4 | Encircled Question Mark Icon | None |
| 8 | Field 5 | "Yes" | Save Record with changes and exit Edit Address Screen 114 |
| 9 | Field 6 | "Return to Editing" | Return to Edit Address Screen 114 |
| 10 | Field 7 | "Discard Changes and Exit" | Do not save record and exit edit address screen 114 |

Explaining Table I in greater detail, in Entry 1, identifies to the "Calling Application". Thus, Column 2 of Entry 1 identifies that this record is relevant to calls to application 140 that are made from application 106. In other words, this record is utilized only when application 140 is accessed from application 106. Column 3 of Entry 1 indicates "None", which means that no other action or call of another application relates to that particular Entry 1. (Since Column 3 relates to Actions or other application calls, Column 3 is only relevant for Entries 8 through 10, which pertain to the option buttons associated with Fields 5 through 7.

Entry 2, identifies the "Calling Screen within the Application". Thus, Column 2 of Entry 2 identifies that this record is relevant to calls to application 140 that are made when edit address screen 114 is being accessed from application 106. Column 3 of Entry 3 indicates "None", which means that no other action or call of another application relates to that particular Entry 2.

Entry 3, identifies the "Calling Function within the Screen". Thus, Column 2 of Entry 3 identifies that this record is relevant to calls to application 140 that are made when edit address screen 114 is being accessed from application 106, and the user has indicated that they wish to "Save" the current record. Column 3 of Entry 3 indicates "None", which means that no other action or call of another application relates to that particular Entry 4.

Entry 4, identifies Field 1 of application 140. Thus, Column 2 of Entry 4 identifies that Field 1 of application 140 is to be populated with the address book icon indicated at 106 in FIG. 3. Column 3 of Entry 4 indicates "None", which means that no other action or call of another application relates to that particular Entry 4.

Entry 5, identifies Field 2 of application 140. Thus, Column 2 of Entry 5 identifies that Field 2 of application 140 is to be populated with the text message "Do you want to save the changes you made to the address belonging to". Column 3 of Entry 6 indicates "None", which means that no other action or call of another application relates to that particular Entry 5.

Entry 6, identifies Field 3 of application 140. Thus, Column 2 of Entry 6 identifies that Field 3 of application 140 is to be populated with the contents of the first and last name of the record currently being displayed in edit address screen 114. When such a retrieval is performed, then Field 3 will be populated with the name "Kate Page". Column 3 of Entry 6 indicates "None", which means that no other action or call of another application relates to that particular Entry 6.

Entry 7, identifies Field 4 of application 140. Thus, Column 2 of Entry 7 identifies that Field 4 of application 140 is to be populated with encircled question mark icon. When such a retrieval is performed, then Field 4 will be populated with the encircled question mark icon indicated at 122P1 in FIG. 6. Column 3 of Entry 7 indicates "None", which means that no other action or call of another application relates to that particular Entry 7.

Entry 8, identifies Field 5 of application 140. Thus, Column 2 of Entry 8 identifies that Field 5 of application 140 is to be populated with the term "Yes". Column 3 of Entry 9 indicates "Save Record with changes and exit Edit Address Screen 114", which means that, if this option is selected, then the changes that were made will be committed to memory and application 140 will cause application 106 to exit edit address screen 114. This is an example of a "lossless" selection.

Entry 9, identifies Field 6 of application 140. Thus, Column 2 of Entry 9 identifies that Field 6 of application 140 is to be populated with the term "Return to Edit". Column 3 of Entry 9 indicates "Return to Edit Address Screen 114", which means if this option is selected, then the changes that were made will not be committed to memory, but edit address screen 114 will be shown again in the same form it was shown prior to the invocation of application 114. This is an example of a "lossless" selection.

Entry 10, identifies Field 7 of application 140. Thus, Column 2 of Entry 10 identifies that Field 7 of application 140 is to be populated with the term "Discard Changes and Exit". Column 3 of Entry 10 indicates "Do not save record and exit edit address screen 114", which means if this option is selected, then the changes that were made will not be committed to memory, and application 140 will cause application 106 to exit edit address screen 114. This is an example of a "lossy" selection.

It should now be apparent that Entries 8, 9 and 10 are populated according to the particular type of application associated with application 140. Thus, in certain situations, the Entries 8, 9, 10 and the like would not be populated with options that would change stored information, but merely ask the user to acknowledge the information presented in Field F2 and/or Field F3 and/or the like. For example, upon completion of a deletion of a number of records, application 140 could be invoked again with a message in Field F2 that simply states "Records have now been deleted" and an option button presenting an "OK" message, asking the user to acknowledge that such deletion had occurred.

Figure 8:
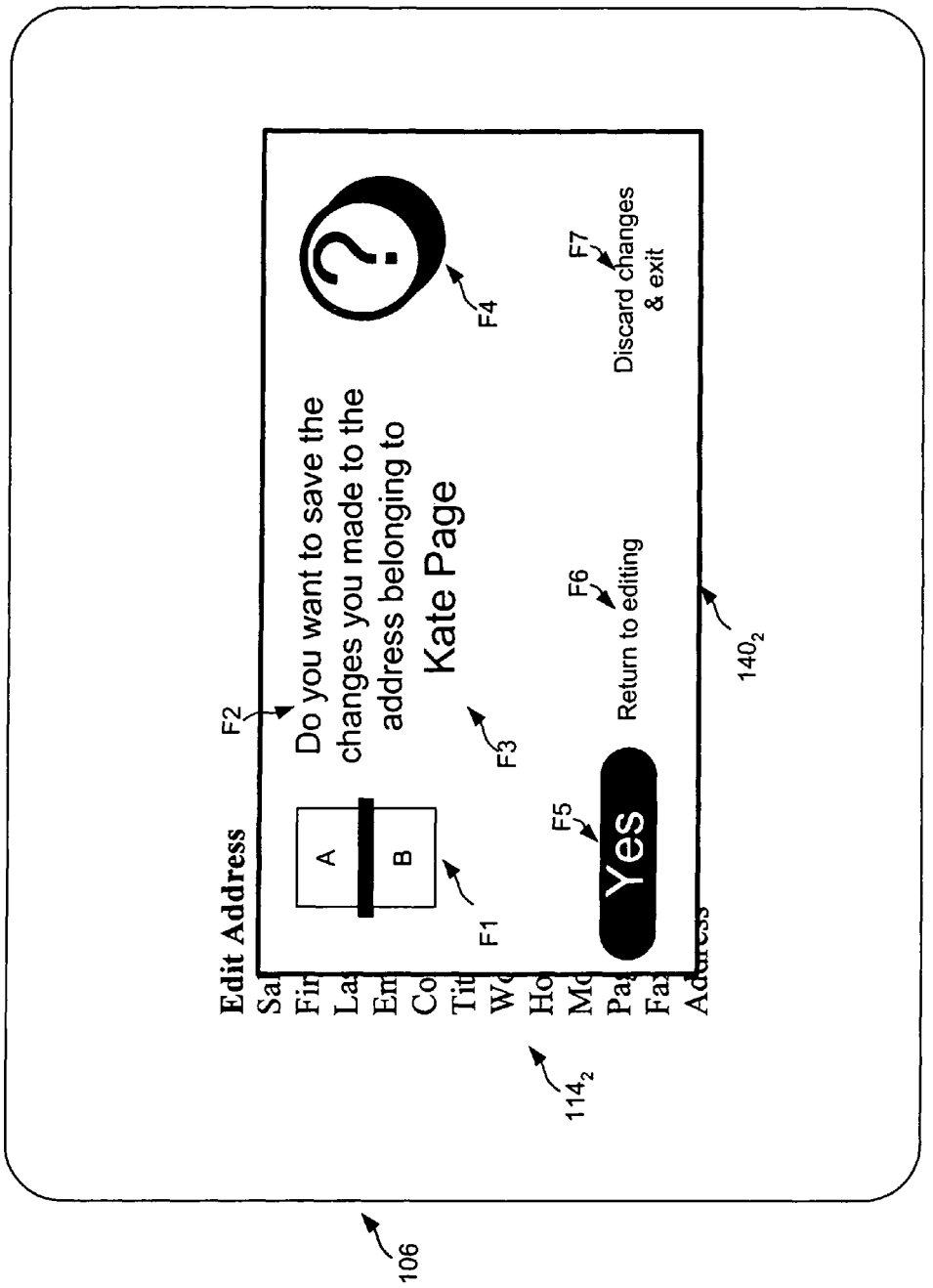
FIG. 8 is a representation of a dialog box application in accordance with another embodiment overlaid on the screen of FIG. 5.

Referring back again to FIG. 5, recall that Edit Address screen 114₁ from FIG. 4 is shown as being updated and now indicated in FIG. 5 as Edit Address screen 114₂. Recall also that Edit Address screen 114₂ now includes a work telephone number including the number "555-555-5555" in the corresponding work telephone number field. Thus, when the user indicates the intention to "save" the record shown in Edit Address screen 114₂, application 140 is invoked and populated using database 144 according to the contents of Table I. The user is thus presented with a dialog box asking the user to confirm the changes, and FIG. 8 shows the appearance of such a dialog box, indicated at 140₂.

Figure 9:
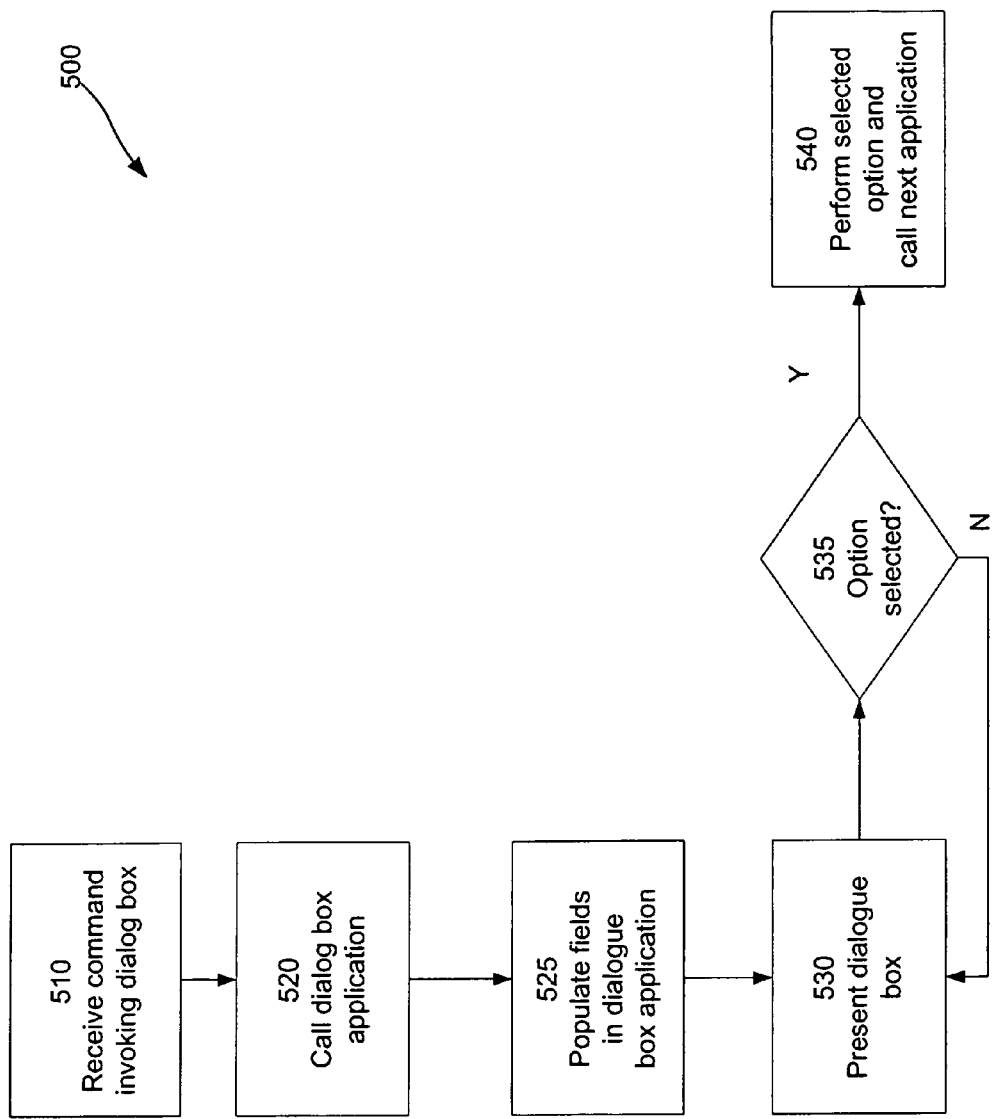
FIG. 9 is a flowchart depicting a method of controlling a display in accordance with another embodiment.

A method of controlling the display of information in accordance with another embodiment will now be discussed with reference to the flowchart shown in FIG. 9, and is indicated generally at 500. In order to assist in the explanation of method 500, reference will be made to the foregoing discussion of device 30. However, it is to be understood that method 500 and/or device 30 can be varied, and need not work in conjunction with each other.

To assist in explaining the method, it will be assumed that processor 62 is currently executing application 106, and that edit address screen $114_2$ is shown.

Beginning first at step 510, a command is received invoking a dialog box. As an example of how this step can be performed, on device 30, trackwheel 50 can be used to access a "save" command from within edit address screen $114_2$.

Next, at step 520, the dialog box application is called. As an example of how this step can be performed, processor 62 will invoke application 140 based on a programming instruction embedded inside application 106.

Next, at step 525, the fields in the dialog box are populated. Continuing with the example above, application 140 will access database 144 and populate the respective fields F1 through F7 within application 140 according to the example given above.

Next, at step 530, the dialog box is presented. Continuing with the example, display 38 will be rendered according to the representation shown in FIG. 8. Also, in a present embodiment, a default pre-selection is placed over field F5, now reading "Yes", which is a lossless option. (Those of skill in the art will now recognize that TWO rolls of track-wheel 50 are used to reach the in field F7 from field F5 in application 140—field F7 being the lossy option—whereas fields F5 and F6 being lossless options. Application 140 can thus be configured such that rolling track-wheel 50 towards the left causes the selection to remain over Field 5, forcing two rolls of track-wheel 50 to reach a lossy selection.)

Next, at step 535, it is determined whether an option has been selected. Continuing with the example, if none of the options presented in fields F5, F6 or F7 have been pre-selected without an accompanying depression of trackwheel 50 along arrow "A", then a "no" determination is made and the method cycles back to step 530. However, if one of the options in fields F5, F6 or F7 are pre-selected, and trackwheel 50 has been depressed along arrow "A", then method 500 advances to step 540 and the appropriate option is performed, such selection and performance being achieved as previously described.

Figure 10:
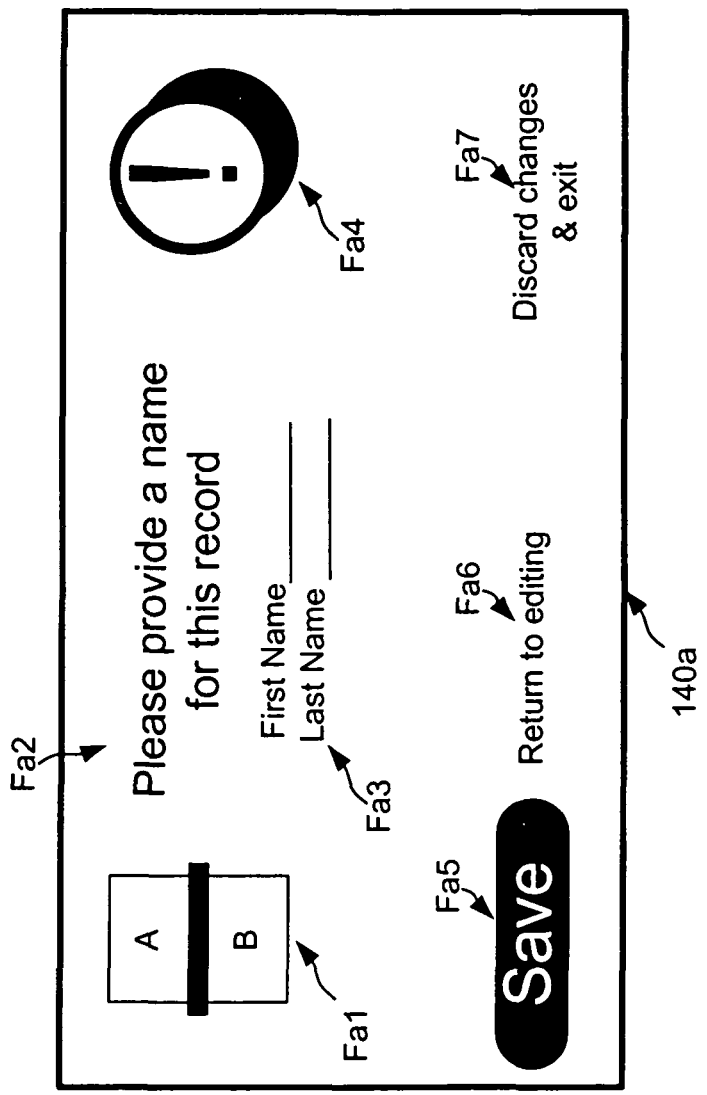
FIG. 10 is a representation of a dialog box application in accordance with another embodiment; and, FIG. 11 is a representation of a dialog box application in accordance with another embodiment.

While the embodiments discussed herein are directed to specific implementations, it will be understood that subsets, combinations and variations of the embodiments are contemplated. For example, a differently-structured database 144 can include additional entries that are usable by a correspondingly varied application 140. Database 144 can include references to colours, and/or positions of where various fields F1 through F7 are to be positioned within the resulting dialog box (such that the physical layout is different than shown in FIG. 8, and/or is otherwise configurable). As a specific example, shown in FIG. 10, a varied dialog box application is indicated at 140a. Similar to dialog box application 140, dialog box application 140a is accessed when the save option from the edit address screen 114 is accessed. However, in this example, dialog box application 140a is accessed when the user has attempted to save a record wherein no first name or last name has been provided. Field Fa3 actually prompts the user for input to provide the first and last name. Field Fa4 shows an exclamation mark to show the informational nature of the dialog box. Similarly Fa5 reads as "Save", to indicate that this is the constructive action that will occur once the first and last name have been provided. In this manner, the dialog box application 140a is invoked to ensure that at least the minimum required information is provided in order to save the record as updated in the particular edit address screen 114.

Figure 11:
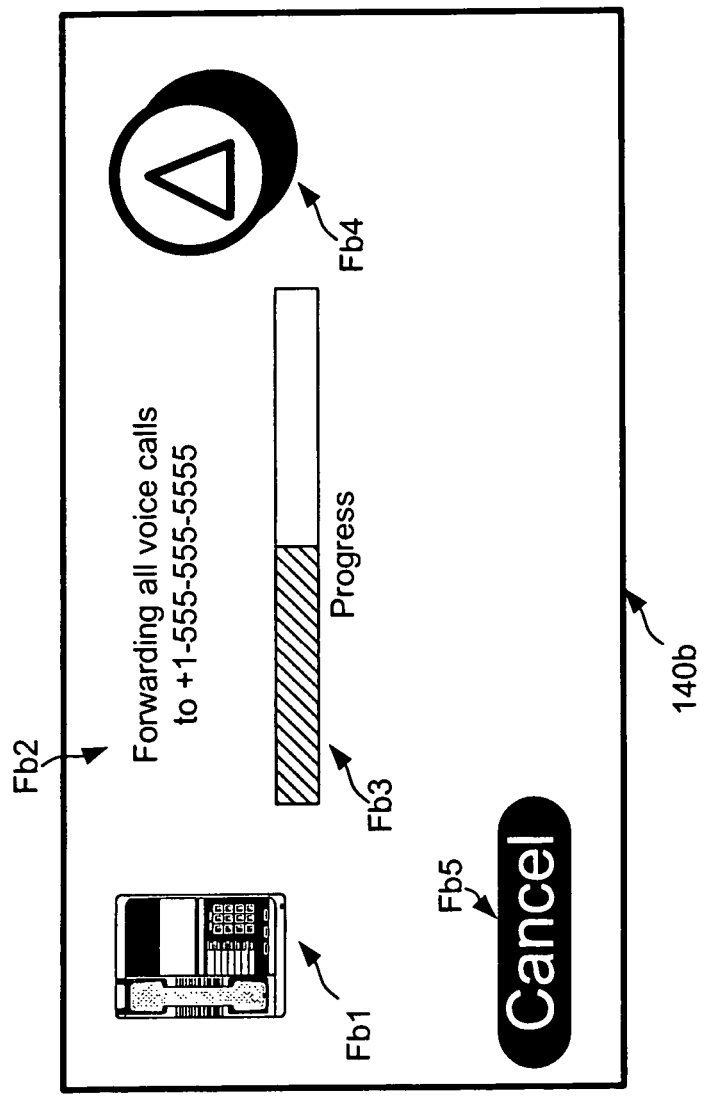

As another specific example, shown in FIG. 11, a varied dialog box application is indicated at 140b. Dialog box application 140b is accessed from the telephone application 94, from which the user has just attempted to send a "call-forwarding" signal to a base station connected wirelessly to device 30 via modem/radio 82. Specifically, the user has attempted to forward all calls to the number "+1-555-555-5555". In this example, dialog box application 140b presents a "progress" bar indicating progress made in delivering the call forward command to the a base station, and receiving a response therefrom. Field Fb3 is thus a "progress meter", which is animated and changes in appearance as communication is established. By the same token, the message icon in field Fb4 is a triangle, indicating a 'caution' sign that the user needs to wait before confirmation is provided that call forwarding was successful.

It should now be apparent that application 140 (and its variants) can be dynamically configured for any application executing on device 30. Application 140 thus provides a novel means for controlling a display in a portable electronic device that is meaningful to the user, while also make efficient use of limited resources on an PED, by dynamically presenting both fixed and variable detailed messages to the user according to the context in which the messages arise. Of particular note, the information presented in the dialog box duplicates or reproduces a certain level of information from the application screen from which the dialog box was invoked. As a result, while the invoking application screen is obscured by the dialog box, sufficient information is still presented in the dialog box so that the user is still aware of the obscured information.

It should also now be apparent that application 140 (and its variants) allow carriers, service providers and administrators associated with device 30 to be able to push new types of message applications to device 30 via a link connecting to wireless base station in range of device 30. Thus, only the contents of such messages need be pushed—i.e. only the contents of database 144 need be updated—thereby conserving bandwidth of a link between device 30 and the base station—since the actual application 140 need not be pushed over the link. Thus, advantageously, both the resources of device 30 and the wireless link connected to device 30 can be conserved by using application 140 and database 144 for presenting messages.

The above-described embodiments are intended to be examples and alterations and modifications may be effected thereto, by those of skill in the art, without departing from the scope defined by the claims appended hereto.

The invention claimed is:

1. A method of controlling a portable electronic device having a display, the method comprising:
    rendering on the display, a screen including contents corresponding to a user application;
    receiving a user-input command at the device that corresponds to a function associated with the screen;
    in response to the user-input command, calling a dialog box application corresponding to the function, the dialog box application having a plurality of configurable fields;
    accessing a database containing records, at least one of the records including a variable message instructing the dialog application to retrieve at least a portion of the contents from the screen from the rendering;

populating at least one of the fields with the at least a portion of the contents based on the instructing;

rendering over the screen, the dialog box application occupying at least a portion of the screen, so as to obscure the contents of the portion of the screen; and when the contents lacks minimum required information:
including at least one text field for user input into the dialog box application; and
receiving user input at the at least one text field of the dialog box application and saving the user input with the contents corresponding to the user application.

2. The method according to claim 1 wherein the user application is selected from the group consisting of a telephone application; a messaging application; a calendar application; an address book application and a memo application.

3. The method according to claim 1 wherein the fields include at least two of: an icon corresponding to the user applications; a fixed message; a variable message; a message-type icon; and an option button.

4. The method of claim 1 wherein the fields comprise at least two option buttons and a default option button pre-selects a lossless action.

5. The method of claim 1 wherein the fields comprise at least three option buttons, two of the option buttons having lossless actions and one of the option buttons having a lossy action; and wherein a default option button is the one of the options buttons having a lossless action that is farthest from the option button having a lossy action.

6. The method of claim 1 wherein the database further comprises layout characteristics representing at least one of locations, colours, sizes and fonts for the fields within the dialog box such that a physical layout of the dialog box application is configurable.

7. The method of claim 6 wherein the layout characteristics are configurable for each the function.

8. A portable electronic device comprising:
a display;
a microcomputer connected to the display and operable to execute a user application;
the microcomputer operable to control the display in order to render on the display at least one screen including contents corresponding to the user application;
a user-input device connected to the microcomputer and operable to forward a received user-input command at the device to the microcomputer; the user-input command corresponding to a function associated with the screen;
the microcomputer further operable to, in response to the user-input command, call a dialog box application corresponding to the function, the dialog box application having a plurality of configurable fields;
the microcomputer further operable to access a database containing records, at least one of the records including a variable message instructing the dialog box application to retrieve at least a portion of the content from the screen;
the microcomputer further operable to populate at least one of the fields with the at least a portion of the contents based on the instructing;
the microcomputer further operable to control the display in order to render over the screen the dialog box application such that at least a portion of the screen is obscured; and
when the contents lacks minimum required information, the microcomputer further operable to:
include at least one text field for user input into the dialog box application; and
receive user input at the at least one text field of the dialog box application and save the user input with the contents corresponding to the user application.

9. The device according to claim 8 wherein the user application is selected from the group consisting of a telephone application; a messaging application; a calendar application; an address book application and a memo application.

10. The device according to claim 8 wherein the fields include at least two of: an icon corresponding to the user applications; a fixed message; a variable message; a message-type icon; and an option button.

11. The device according to claim 8 wherein the fields comprise at least two option buttons and a default option button pre-selects a lossless action.

12. The device according to claim 8 wherein the fields comprise at least three option buttons, two of the option buttons having lossless actions and one of the option buttons having a lossy action; and wherein a default option button pre-selects the one of the options buttons having a lossless action that is farthest from the option button having a lossy action.

13. The device according to claim 12 wherein the database further comprises layout characteristics representing at least one of locations and colours and sizes and fonts for the fields within the dialog box such that a physical layout of the dialog box application is configurable.

14. The device according to claim 13 wherein the layout characteristics are configurable for each the function.

15. The method according to claim 1 wherein the device includes a modem-radio and is operable to communicate wirelessly with a base station.

16. The method of claim 15 wherein the device is operable to update the database based on command instructions received wirelessly from the base station.

17. A non-transitory computer-readable medium containing a plurality of programming instructions, the instructions for controlling a display of a portable electronic device; the instructions including a method comprising:
rendering on the display, a screen including contents corresponding to a user application;
receiving a user-input command at the device that corresponds to a function associated with the screen;
in response to the user-input command, calling a dialog box application corresponding to the function, the dialog box application having a plurality of configurable fields;
accessing a database containing records, at least one of the records including a variable message instructing the dialog application to retrieve at least a portion of the contents from the screen from the rendering;
populating at least one of the fields with the at least a portion of the contents based on the instructing;
rendering over the screen, the dialog box application occupying at least a portion of the screen, so as to obscure the contents of the portion of the screen; and
when the contents lacks minimum required information:
including at least one text field for user input into the dialog box application; and
receiving user input at the at least one text field of the dialog box application and saving the user input with the contents corresponding to the user application.

* * * * *